(12) United States Patent
Lee et al.

(10) Patent No.: US 8,228,817 B2
(45) Date of Patent: Jul. 24, 2012

(54) QUALITY OF SERVICE CONTROL OF REVERSE TRAFFIC CHANNEL FOR A MOBILE COMMUNICATION DEVICE

(75) Inventors: Jae Sun Lee, San Diego, CA (US); Su-Lin Low, San Diego, CA (US)

(73) Assignee: Via Telecom, Inc., San Diego, CA (US)

( * ) Notice: Subject to any disclaimer, the term of this patent is extended or adjusted under 35 U.S.C. 154(b) by 312 days.

(21) Appl. No.: 12/754,684

(22) Filed: Apr. 6, 2010

(65) Prior Publication Data

US 2011/0242998 A1 Oct. 6, 2011

(51) Int. Cl.
*H04L 12/26* (2006.01)
*G08C 25/02* (2006.01)
*H04W 24/00* (2009.01)

(52) U.S. Cl. .................... 370/252; 714/748; 455/423
(58) Field of Classification Search ............. None
See application file for complete search history.

(56) References Cited

U.S. PATENT DOCUMENTS

| | | | | |
|---|---|---|---|---|
| 7,372,834 B2* | 5/2008 | Kim et al. | ............. | 370/331 |
| 7,548,760 B2* | 6/2009 | Vasudevan et al. | ............. | 455/522 |
| 7,587,203 B2* | 9/2009 | Shahidi et al. | ............. | 455/423 |
| 2004/0179480 A1* | 9/2004 | Attar et al. | ............. | 370/252 |
| 2004/0223507 A1* | 11/2004 | Kuchibhotla et al. | ......... | 370/428 |
| 2004/0228286 A1* | 11/2004 | Kim et al. | ............. | 370/252 |
| 2004/0228287 A1* | 11/2004 | Seol et al. | ............. | 370/252 |
| 2004/0228288 A1* | 11/2004 | Seol et al. | ............. | 370/252 |
| 2004/0242231 A1* | 12/2004 | Tang et al. | ............. | 455/434 |
| 2005/0283701 A1* | 12/2005 | Kim | ............. | 714/748 |
| 2007/0091816 A1* | 4/2007 | Lee et al. | ............. | 370/252 |
| 2009/0083601 A1* | 3/2009 | Gorokhov et al. | ............. | 714/748 |
| 2010/0232311 A1* | 9/2010 | Zhang et al. | ............. | 370/252 |

* cited by examiner

*Primary Examiner* — Clemence Han
(74) *Attorney, Agent, or Firm* — Thomas, Kayden, Horstemeyer & Risley, LLP

(57) ABSTRACT

A mobile communication device for providing QoS of packet transmission is provided. The packet transmission from and to the mobile communication device is performed by repeating a predetermined number of interlaces by a predetermined cycle. In the mobile communication device, a wireless module transmits a first sub-packet of a first packet and a first sub-packet of a second packet to a mobile communication network, and receives a response message corresponding to the first sub-packet of the first packet from the mobile communication network, wherein the first sub-packet of the first packet is transmitted in a first interlace prior to a second interlace in which the first sub-packet of the second packet is transmitted. Also, a controller module calculates a plurality of QoS parameters for a second sub-packet of the second packet in response to the response message, prepares the second sub-packet of the second packet with the QoS parameters, and transmits the second sub-packet of the second packet in the second interlace to the mobile communication network via the wireless module.

20 Claims, 7 Drawing Sheets

_QUALITY OF SERVICE CONTROL OF REVERSE TRAFFIC CHANNEL FOR A MOBILE COMMUNICATION DEVICE_

BACKGROUND OF THE INVENTION

1. Field of the Invention

The invention generally relates to Quality of Service (QoS) control in wireless communications, and more particularly, to QoS control of reverse traffic channel for mobile communication devices.

2. Description of the Related Art

For forward packet data transmission in a mobile communication system, an access terminal (AT) is assigned a forward traffic channel from an access network (AN). The mobile communication systems, as will be described below, cover satellite systems, Integrated Services Digital Network (ISDN), 1x Code Division Multiple Access 2000 (1x CDMA 2000), 1x Evolution-Data Optimized (1x EVDO) system, and Long Term Evolution (LTE) system, etc. Upon reception of the forward packet data, the AN determines whether the reception is successful, and if errors are detected in the packet data, the AN requests for retransmission by a Hybrid Automatic Repeat Request (HARQ) mechanism. The HARQ mechanism is a retransmission scheme for requesting retransmission of an error-detected packet data to ensure the delivery of the packet data. For reverse packet (sub-packet) data transmission, an AT is assigned an access channel and a reverse traffic channel from an AN. The access channel is used by the AT to initiate communication with the AN or to respond to an AT directed message. The access channel consists of a pilot channel and a data channel. The reverse traffic channel is used by the AT to transmit user-specific traffic or signaling information to the AN. The reverse traffic channel comprises a pilot channel, a reverse rate indicator (RRI) channel, a data rate control (DRC) channel, an acknowledgement (ACK) channel, and a data channel. The RRI channel is used to indicate the transmission data rate used on the reverse traffic channel. The RRI channel is time-multiplexed with the pilot channel. The DRC channel is used by the AT to indicate to the AN the supportable forward traffic channel data rate and the best serving sector on the forward traffic channel. The ACK channel is used by the AT to inform the AN whether or not the packet data transmitted on the forward traffic channel has been received successfully.

Take a 1x EVDO system (or otherwise called a RevA 1x High Rate Packet Data (1xHRPD) system) for example. The Reverse Traffic Channel Media Access Control (RTCMAC) Subtype3 Protocol is the RTCMAC Layer protocol of the RevA 1xHRPD system that provides the rules and requirements for reverse traffic channel. Together with the Physical Layer specification, it specifies the requirement for reverse link a HARQ operation, which allows the reverse traffic channel to retransmit a missed sub-packet at the RTCMAC Layer. The grant calculation within the RTCMAC Layer addresses intra-AT Quality of Service (QoS) for multiple current active MAC flows at the AT. This is accomplished via per active MAC flow Traffic-to-Pilot power ratio (T2P) control. Each active MAC flow contributes to a sector loading and its contribution is strongly correlated with its average transmit T2P. The average T2P of an active MAC flow is controlled based on the requirements of the MAC flow, requirements of other concurrent active MAC flows, transmit power constraints, and sector loading.

FIG. 1 is a timing chart illustrating the QoS calculation and reverse packet (sub-packet) transmission for a conventional RTCMAC Subtype3 Protocol in a RevA 1xHRPD system. In a packet (frame)-based data communications system, a packet (frame) is usually fragmented into smaller quanta and each individual quantum associated with the packet (frame) is transmitted in an interlaced manner with quanta associated with other packets (frames). As shown in FIG. 1, the packet transmission is performed by repeating 3 interlaces by a predetermined cycle. For example, a first packet is composed of the sub-packets transmitted in the interlace no. 1, and a second packet is composed of the sub-packets transmitted in the interlace no. 2, and a third packet is composed of the sub-packets transmitted in the interlace no. 0. Assume the sub-packet transmitted at sub-frame n−3 is the first sub-packet of the second packet, denoted as interlace no. 2, and the current reverse sub-packet is the second sub-packet of the second packet to be transmitted at sub-frame n. The HARQ (ACK or NAK) for a sub-packet may be received from the forward MAC channel at slot 3 of the second next sub-frame to the sub-frame where the sub-packet is transmitted. That is, the HARQ for the first sub-packet of the second packet is received at slot 3 of sub-frame n−1. The QoS calculation of reverse sub-packet size and transmission mode determination for the current reverse sub-packet to be transmitted at sub-frame n are conventionally performed before sub-frame n and after the HARQ for the previous sub-packet of the same packet transmitted at sub-frame n−3 is available at slot 3 of sub-frame n−1. In addition, the reverse sub-packet preparation includes packet processing of all the RevA 1xHRPD stack layers, and symbol processing which involves interleaving by the physical layer. FIG. 2 is a timing chart further illustrating the QoS calculation and reverse sub-packet transmission for a conventional RTCMAC Subtype3 Protocol in the RevA 1xHRPD system. As shown in FIG. 2, the reverse sub-packet preparation may be further divided into 5 steps. After the HARQ for the previous sub-packet of the same packet transmitted at sub-frame n−3 is received at slot 3 of sub-frame n−1 (step 1), the QoS calculation is performed to determine the reverse sub-packet size and transmission mode of the current reverse sub-packet to be transmitted at sub-frame n (step 2). Subsequently, the packet processing of all the RevA 1xHRPD stack layers is performed to prepare the current reverse sub-packet to be transmitted at sub-frame n (step 3), and the symbol processing which involves interleaving by the physical layer is also performed (step 4). Lastly, the modulation of the current reverse sub-packet is processed by the physical layer and then the current reverse sub-packet is transmitted to the AN at sub-frame n (step 5).

FIG. 3 is a flow chart illustrating the QoS calculation for the conventional RTCMAC Subtype3 Protocol in the RevA 1xHRPD system. The QoS calculation is performed by using an RTCMAC QoS Algorithm. To begin, the RTCMAC QoS Algorithm first updates $PilotStrength_{n,s}$, $QRAB_n$, $FRAB_n$, and $QRABps_n$ from forward MAC channel information $PilotStrength_{m,s}$, $SlotQRAB_{m,s}$, DRCLock, and $SlotFRAB_{m,s}$ at sub-frame n (step S310). Next, it is determined whether the QoS has been just started or restarted by checking if $LastBucketLevelMax_i$ is null and $BucketLevelMax_i$ is not null (step S315), wherein the $BucketLevelMax_i$ represents the bucket level (or accumulated T2P resource) assigned by the connected network at sub-frame n for MAC flow i and $LastBucketLevelMax_i$ represents the last recorded value of $BucketLevelMax_i$. At the first time of QoS, $LastBucketLevelMax_i$ is null and is initialized if $BucketLevelMax_i$ is not NULL. Latter, if the connected network wishes to re-start QoS, it may transmit a $BucketLevelMax_i$ with null value to trigger initialization of $LastBucketLevelMax_i$. Subsequent to step S315, if so, $BucketLevel_{i,n}$, $T2PInFlow_{i,n-1}$, $TT2PHold_{i,n-1}$, $T2POutFlow_{i,n-1}$, and $BucketLevelSat_{i,n}$ are initialized (step S320). Subsequent to step S315, if not, with the updated PilotStrength$_{n,s}$ and FRAB$_n$, and initialized T2PInFlow$_{i,n-1}$, and T2POutFlow$_{i,n-1}$, T2PInFlow$_{i,n}$ may be updated (step S330) as follows:

$$\Delta T2PInFlow_{i,n} =$$
$$f1\begin{pmatrix} PilotStrength_{n,s}, FRAB_n, T2PInFlow_{i,n-1}, BucketLevel_{1,n}, \\ BucketLevelSat_{i,n} \end{pmatrix}$$

$$T2PInFlow_{i,n} = f2(\Delta T2PInFlow_{i,n}, T2POutFlow_{i,n-1}, T2PInFlow_{i,n-1})$$

Subsequently, the reverse sub-packet size and transmission mode is determined based on PotentialT2POutflow$_{i,HC}$ and QOutflow$_{i,HC}$ (step S340), wherein PotentialT2POutflow$_{i,HC}$ and QOutflow$_{i,HC}$ may be obtained as follows:

PotentialT2POutflow$_{i,HC}$=f3(BucketLevel$_{i,n}$, T2PInFlow$_{i,n}$)

QOutflow$_{i,HC}$=f4(Queue size in subframe $n$, PotentialT2POutflow$_{i,HC}$)

Regarding the detailed calculation of the reverse sub-packet size and transmission mode, reference may be made to the 3GPP2 specification of the RevA 1xHRPD system (the 3GPP2 C.S-0024-A v3.0 specification). To continue, the RTCMAC QoS Algorithm updates TxT2P$_n$ based on the determined sub-packet size for sub-frame n as follows:

TxT2P$_n$=f5(transmitting subpacket size at subframe $n$)

To be more specific, if the HARQ received by the AT is an ACK for the sub-packet transmitted at sub-frame n–3 from the forward MAC channel, the sub-packet size for the sub-packet to be transmitted at sub-frame n is the determined sub-packet size in step S340 (step S350). Otherwise, if the HARQ received by the AT is a NAK for the sub-packet transmitted at sub-frame n–3, then the sub-packet to be transmitted at sub-frame n will be the sub-packet transmitted at sub-frame n–3 (step S355), which means a retransmission is to be performed. After updating TxT2P$_n$, T2POutflow$_{i,n}$ may be updated accordingly (step S360) as follows:

T2POutflow$_{i,n}$=f6(transmitting subpacket size at subframe $n$, TxT2P$_n$)

BucketLevelSat$_{i,n+1}$ and BucketLevel$_{i,n+1}$ for sub-frame n+1 are subsequently updated (step S370) as follows:

$$BucketLevelSat_{i,n+1} = f7(T2PInFlow_{i,n}, FRAB_n)$$

$$BucketLevel_{i,n+1} = f8\begin{pmatrix} BucketLevel_{i,n}, T2PInFlow_{i,n}, T2POutFlow_{i,n}, \\ BucketLevelSat_{1,n+1} \end{pmatrix}$$

At last, the RRIChannelGain for the sub-packet to be transmitted at sub-frame n is calculated (step S380). If the received HARQ is an ACK, a new RRIChannelGain for the sub-packet to be transmitted at sub-frame n is calculated as follows:

RRIChannelGainNew$_n$=f9(subpacket 0 at subframe $n$)

Otherwise, if the received HARQ is a NAK, the old RRIChannelGain for the sub-packet to be transmitted at sub-frame n is calculated as follows:

RRIChannelGainOld$_n$=f10(subpacket id at subframe $n$)

Note that f1~f10 described above are functions for deriving the QoS parameters, and reference may be made to the 3GPP2 specification of the RevA 1xHRPD system.

Thus, the QoS calculation, packet processing, and symbol processing need to be accomplished in just one slot (i.e. the slot 3 of sub-frame n−1) before the current reverse sub-packet for sub-frame n can be transmitted at sub-frame n. Thus, a huge burden is placed on the AT, such as an extremely tight CPU instruction rate (MIPS). In addition, if the AT misses the scheduled time at sub-frame n and transmits the packet at sub-frame n+1 because all of step 1 to step 5 are not done by the start of sub-frame n due to tight MIPS, the AN can't decode the packet due to wrong interlace number which is used for interleaving in the RevA 1xHRPD system. As a result, it is not only hard to implement such a design in most existing AT systems, but also such a design may cause a degression in packet transmission rate.

BRIEF SUMMARY OF THE INVENTION

Accordingly, embodiments of the invention provide apparatuses and methods for QoS of packet transmission. In one aspect of the invention, a mobile communication device for providing QoS of packet transmission is provided. For the mobile communication device, the packet transmission is performed by repeating a predetermined number of interlaces by a predetermined cycle. The mobile communication device comprises a wireless module and a controller module. The wireless module transmits a first sub-packet of a first packet and a first sub-packet of a second packet to a mobile communication network, and receives a response message corresponding to the first sub-packet of the first packet from the mobile communication network, wherein the first sub-packet of the first packet is transmitted in a first interlace prior to a second interlace in which the first sub-packet of the second packet is transmitted. The controller module calculates a plurality of QoS parameters for a second sub-packet of the second packet in response to the response message, prepares the second sub-packet of the second packet with the QoS parameters, and transmits the second sub-packet of the second packet in the second interlace to the mobile communication network via the wireless module.

In another aspect of the invention, a method for providing QoS of packet transmission in a mobile communication device is provided. For the mobile communication device, the packet transmission is performed by repeating a predetermined number of interlaces by a predetermined cycle. The method comprises transmitting a first sub-packet of a first packet and a first sub-packet of a second packet to a mobile communication network, wherein the first sub-packet of the first packet is transmitted in a first interlace prior to a second interlace in which the first sub-packet of the second packet is transmitted, and a response message corresponding to the first sub-packet of the first packet is received from the mobile communication network. Upon receiving the response message, a plurality of QoS parameters for a second sub-packet of the second packet are calculated, and the second sub-packet of the second packet is prepared with the QoS parameters. Lastly, the second sub-packet of the second packet is transmitted in the second interlace to the mobile communication network.

Other aspects and features of the invention will become apparent to those with ordinary skill in the art upon review of the following descriptions of specific embodiments of the mobile communication device and the method for providing QoS of packet transmission.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
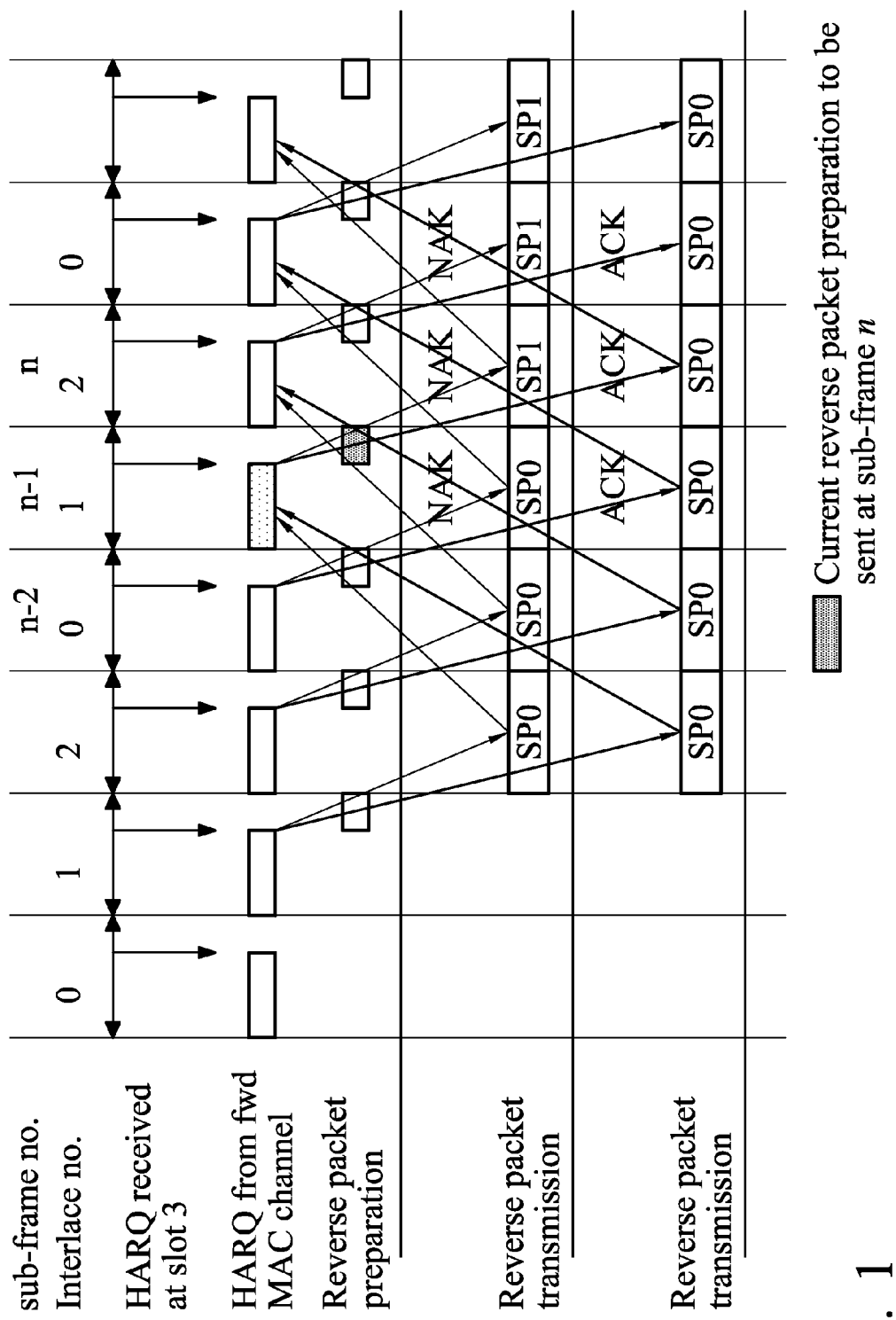
FIG. 1 is a timing chart illustrating the QoS calculation and reverse packet (sub-packet) transmission for a conventional RTCMAC Subtype3 Protocol in a RevA 1xHRPD system.
Figure 2:
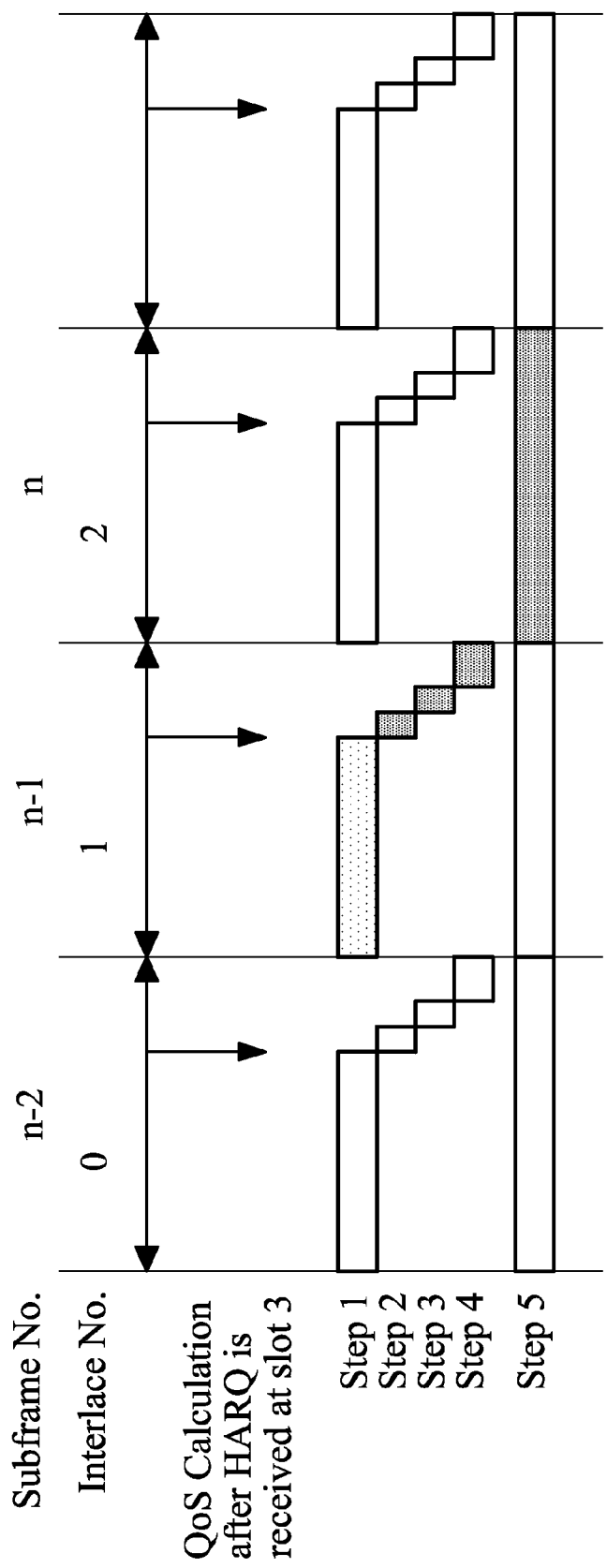
FIG. 2 is a timing chart further illustrating the QoS calculation and reverse packet (sub-packet) transmission for a conventional RTCMAC Subtype3 Protocol in the RevA 1xHRPD system.
Figure 3:
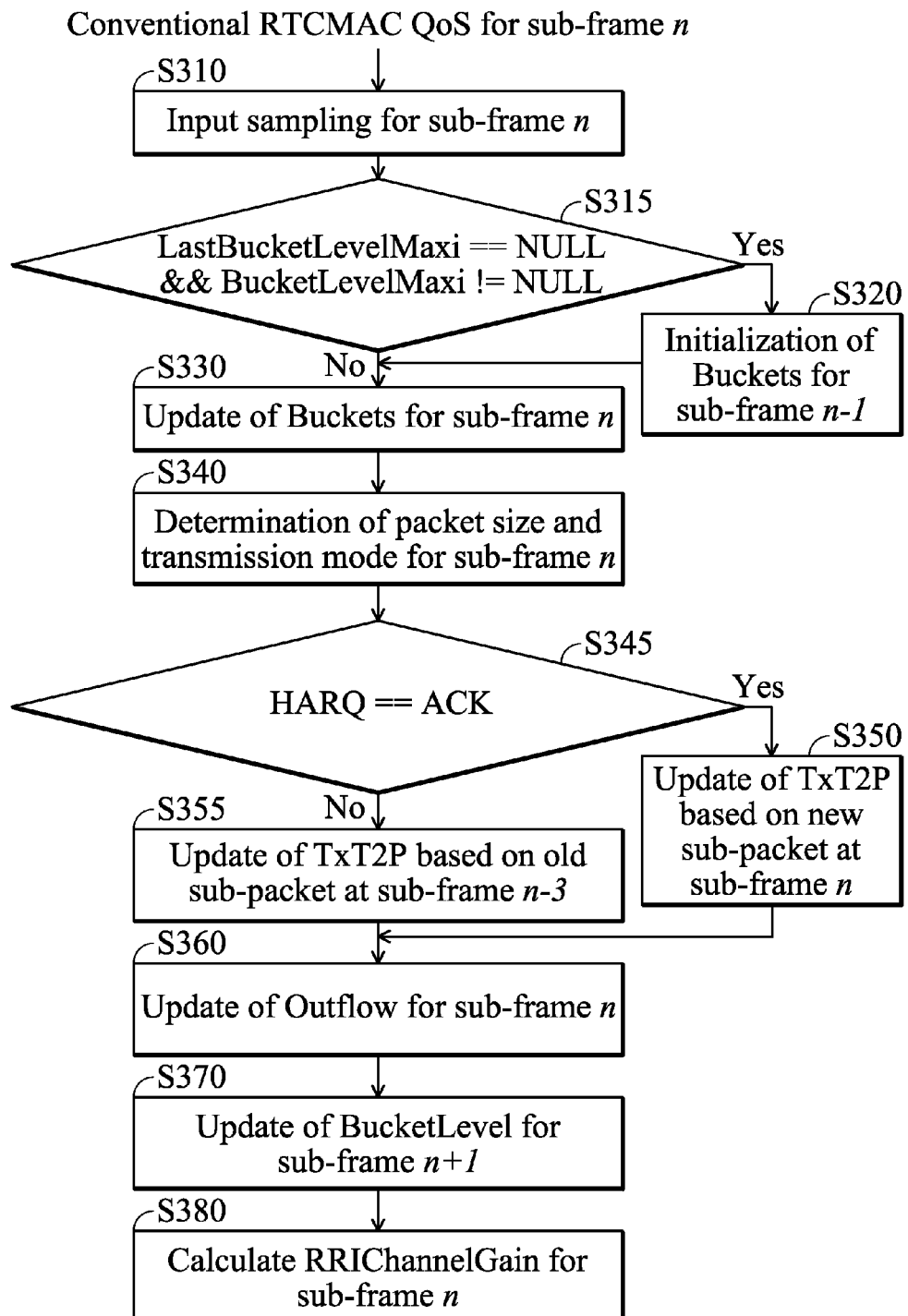
FIG. 3 is a flow chart illustrating the QoS calculation for the conventional RTCMAC Subtype3 Protocol in the RevA 1xHRPD system.
Figure 4:
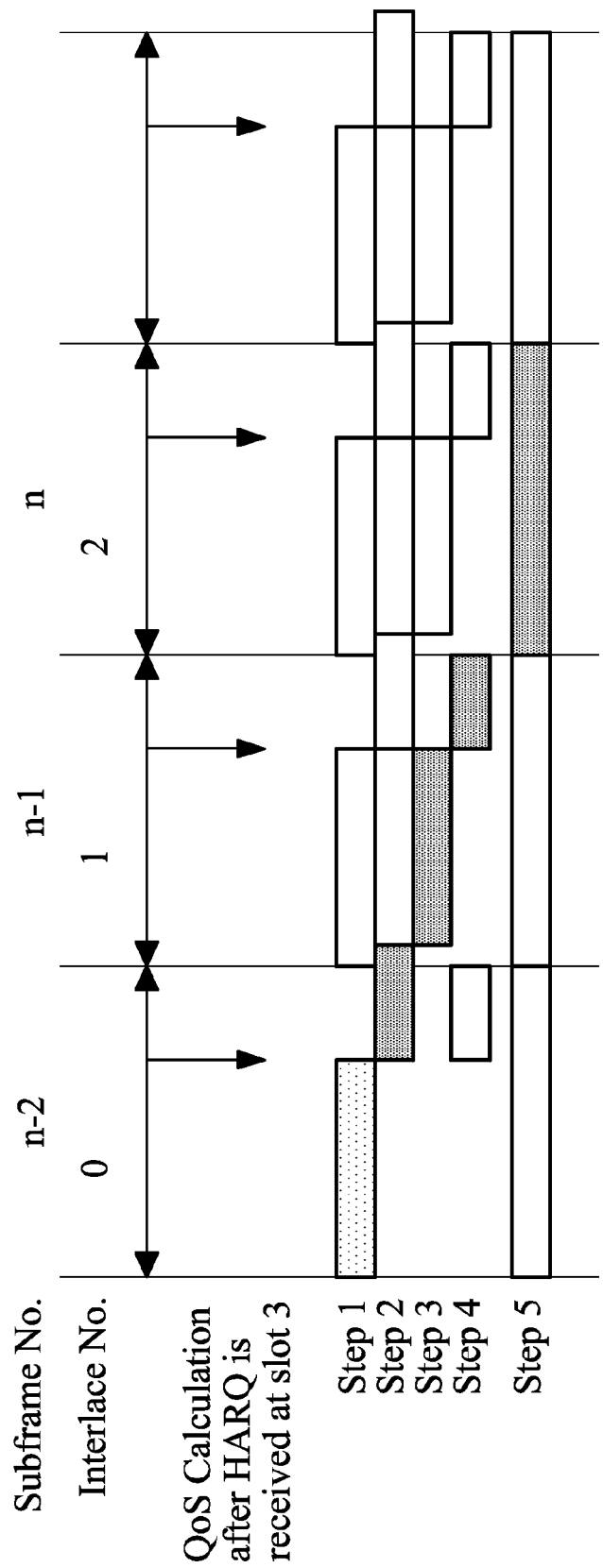
FIG. 4 is a timing chart illustrating the QoS calculation and reverse packet (sub-packet) transmission in a RevA 1xHRPD system according to an embodiment of the invention.

In order to implement an RTCMAC QoS design in most mobile communication devices which may have limited computing capability, the invention provides a new QoS calculation method which may be accomplished at one sub-frame earlier than a current packet transmission time. FIG. 4 is a timing chart illustrating the QoS calculation and reverse sub-packet transmission in a RevA 1xHRPD system according to an embodiment of the invention. Similar to the timing chart in FIG. 1, the sub-packet transmission in FIG. 4 is performed by repeating 3 interlaces by a predetermined cycle. For example, a first packet is composed of the sub-packets transmitted in the interlace no. 1, and a second packet is composed of the sub-packets transmitted in the interlace no. 2, etc, as shown in FIG. 4. Assume the sub-packet transmitted at sub-frame n−4 is the first sub-packet of the first packet, denoted as interlace no. 1, the sub-packet transmitted at sub-frame n−3 is the first sub-packet of the second packet, denoted as interlace no. 2, and the current reverse sub-packet is the second sub-packet of the second packet to be transmitted at sub-frame n. It is worth noting that the QoS calculation for the current reverse sub-packet to be transmitted at sub-frame n (step 2) is performed upon receiving at slot 3 of sub-frame n−2 the HARQ for the sub-packet transmitted at sub-frame n−4, i.e. the first sub-packet of the first packet (step 1). Next, packet processing of all the RevA 1xHRPD stack layers is performed (step 3), followed by symbol processing (step 4). Lastly, modulation of the current reverse sub-packet, i.e. the second sub-packet of the second packet, is performed and the current reverse sub-packet is transmitted at sub-frame n to the AN (step 5). Note that the QoS calculation for the current reverse sub-packet is accomplished at one sub-frame earlier than a current packet transmission time, i.e. at sub-frame n−1, so there is sufficient time to prepare the transmission packet to alleviate the burden of an extremely tight CPU MIPS of mobile communication devices (or RevA 1xHRPD ATs). In addition to the RevA 1xHRPD system, the new QoS calculation method may be used in other mobile communication systems, such as RevB 1xHRPD system, RevC 1xHRPD system, RevD 1xHRPD system, other evolutionary systems of the 1x CDMA 2000 system family, or any other wireless communication systems.

Figure 5:
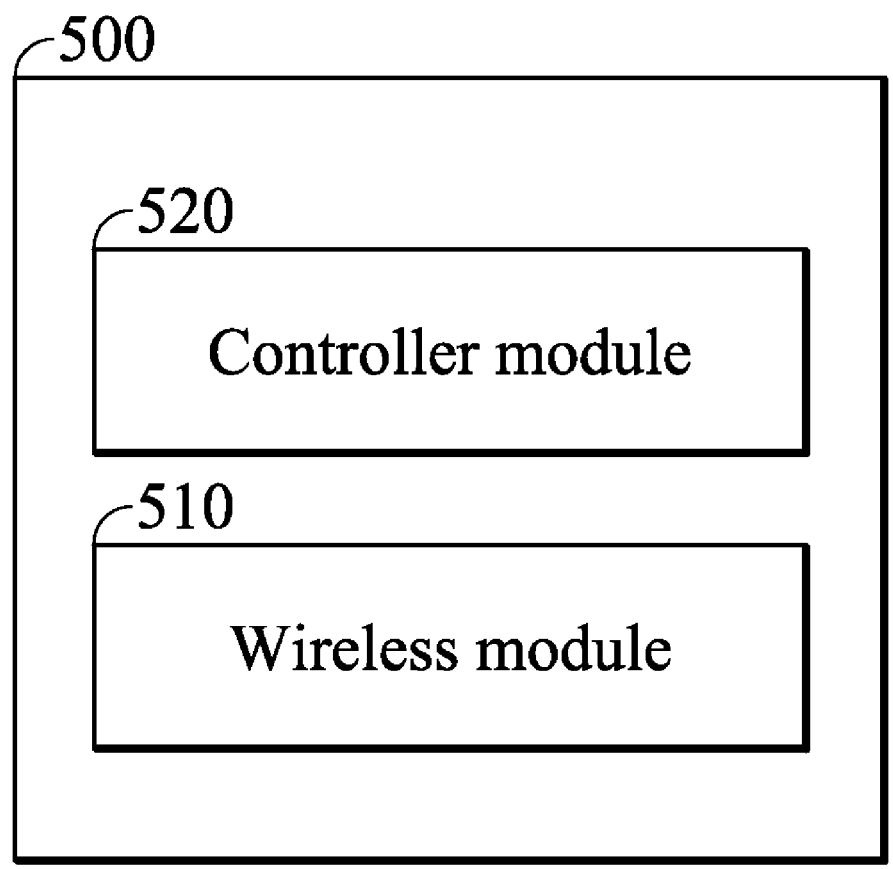
FIG. 5 is a block diagram illustrating a mobile communication device according to an embodiment of the invention.

FIG. 5 is a block diagram illustrating a mobile communication device according to an embodiment of the invention. The mobile communication device 500 comprises a wireless module 510 and a controller module 520. The wireless module 510 provides wireless packet transmission and reception to and from a mobile communication network (not shown), wherein the packet transmission is performed by repeating a predetermined number of interlaces by a predetermined cycle. That is, each packet is fragmented into smaller quanta and each individual quantum associated with the packet is transmitted in an interlaced manner with quanta associated with other packets. In one embodiment, the predetermined number of interlaces is 3, as shown in FIG. 4. The controller module 520 performs a QoS calculation and reverse sub-packet preparation, and further requests that the wireless module 510 transmit the reverse sub-packet to the mobile communication network, wherein the QoS calculation for the second sub-packet of the second packet to be transmitted at sub-frame n is performed in response to receiving at slot 3 of sub-frame n−2 the HARQ for the first sub-packet of the first packet transmitted at sub-frame n−4 instead of being performed in response to receiving at slot 3 of sub-frame n−1 the HARQ for the first sub-packet of the second packet transmitted at sub-frame n−3. In some embodiments, the mobile communication device 500 is wirelessly connected to a mobile communication network, which is not shown in FIG. 5. The mobile communication device 500 and the unshown mobile communication network are formed as a mobile communication for providing Quality of Service of packet transmission in accordance of the present invention.

Figure 6:
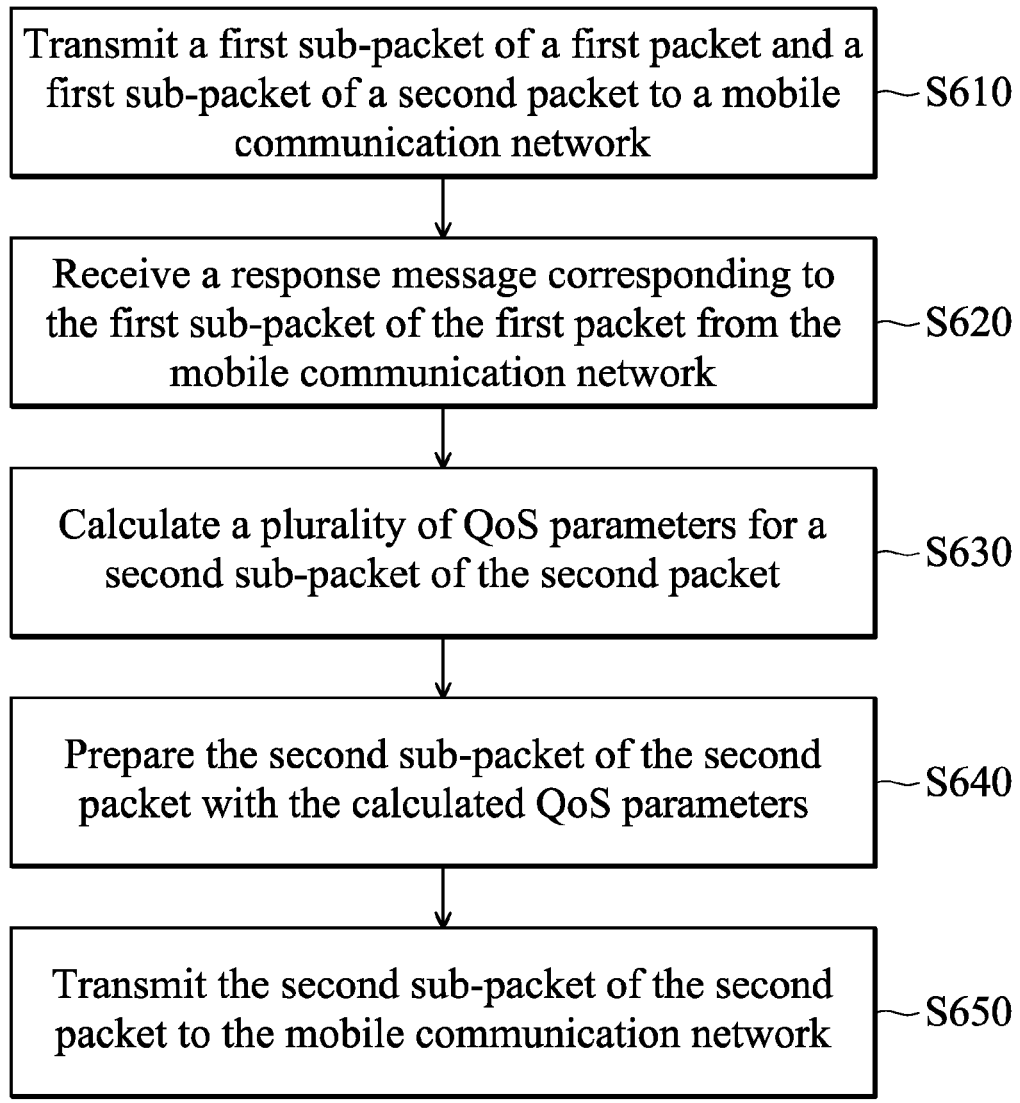
FIG. 6 is a flow chart illustrating a method for providing QoS of packet transmission in a mobile communication device according to an embodiment of the invention.

FIG. 6 is a flow chart illustrating a method for providing QoS of packet transmission in a mobile communication device according to an embodiment of the invention. Note that the packet transmission from and to the mobile communication device 500 is performed by repeating a predetermined number of interlaces by a predetermined cycle. Regarding an interlace number of 3 for a mobile communication device, reference may be made to FIG. 4 for the timing chart of the QoS calculation and packet transmission. At first, the mobile communication device 500 transmits a first sub-packet of a first packet and a first sub-packet of a second packet to a mobile communication network (step S610). Specially, the first sub-packet of the first packet is transmitted in a first interlace prior to a second interlace in which the first sub-packet of the second packet is transmitted. Afterwards, the mobile communication device 500 receives a response message corresponding to the first sub-packet of the first packet from the mobile communication network (step S620). Upon receiving the response message, the mobile communication device 500 calculates a plurality of QoS parameters for a second sub-packet of the second packet (step S630), and prepares the second sub-packet of the second packet with the calculated QoS parameters (step 640). When the second sub-packet of the second packet is ready, the mobile communication device 500 transmits the second sub-packet of the second packet in the second interlace to the mobile communication network (step 650).

Figure 7:
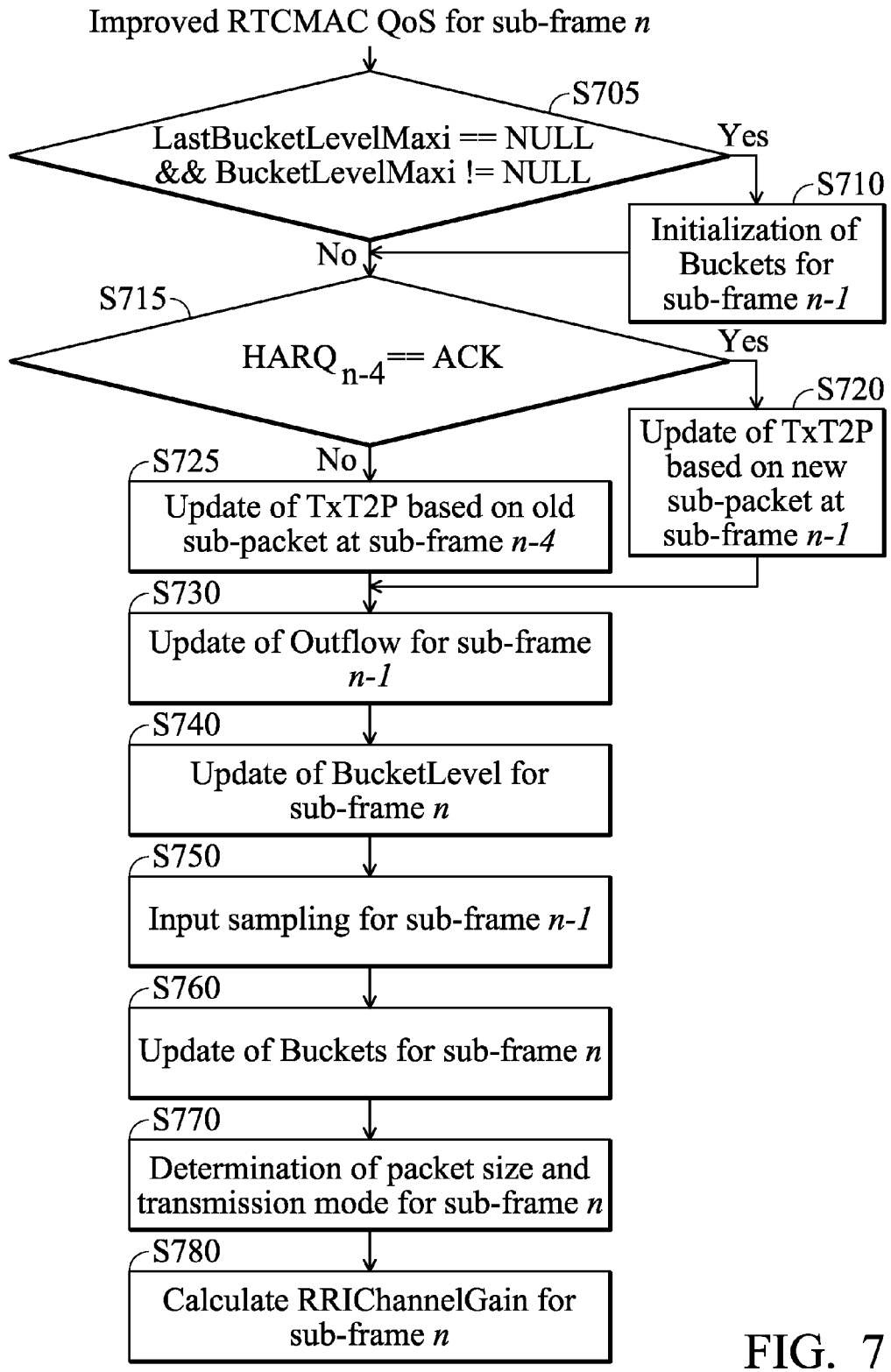
FIG. 7 is a flow chart illustrating an improved RTCMAC QoS Algorithm according to an embodiment of the invention.

It is noted that an improved RTCMAC QoS Algorithm is used for the QoS calculation described above. FIG. 7 is a flow chart illustrating the improved RTCMAC QoS Algorithm according to an embodiment of the invention. To begin, the improved RTCMAC QoS Algorithm first determines whether the QoS has been just started or restarted by checking if LastBucketLevelMax$_i$ is null and BucketLevelMax$_i$ is not null (step S705), wherein the BucketLevelMax$_i$ represents the bucket level (or accumulated T2P resource) assigned by the connected network at sub-frame n for MAC flow i and Last-BucketLevelMax$_i$ represents the last recorded value of BucketLevelMax$_i$. At the first time of QoS, LastBucketLevelMax$_i$ is null and is initialized if BucketLevelMax$_i$ is not NULL. Latter, if the connected network wishes to re-start QoS, it may transmit a BucketLevelMax$_i$ with null value to trigger initialization of LastBucketLevelMax$_i$. Subsequent to step S705, if so, BucketLevel$_{i,n}$, T2PInFlow$_{i,n-1}$, TT2PHold$_{i,n-1}$, T2POutFlow$_{i,n-1}$, and BucketLevelSat$_{i,n}$ are initialized (step S710), wherein BucketLevel$_{i,n}$ indicates the bucket level (or accumulated T2P resource) at sub-frame n for MAC flow i, T2PInFlow$_{i,n-1}$ denotes the average T2P resource added to the bucket for MAC flow i at sub-frame n, and TT2PHold$_{i,n-1}$ indicates the number of sub-frames following the sub-frame n. The T2P allocation received via the Grant message is maintained by the mobile communication device for MAC flow i. T2POutFlow$_{i,n-1}$ denotes the average T2P resource utilized (and subtracted) from the bucket for MAC flow i at sub-frame n, and BucketLevelSat$_{i,n}$ indicates the saturation level for BucketLevel$_{i,n}$.

To continue, the improved RTCMAC QoS Algorithm updates TxT2P$_{n-1}$ based on the determined packet size for sub-frame n−1 as follows:

TxT2P$_{n-1}$=ƒ5(transmitting subpacket size at subframe n−1), wherein TxT2P$_{n-1}$ represents the transmitted T2P during sub-frame n−1. To be more specific, it is determined whether the HARQ for sub-frame n−4 received by the mobile communication device 500 is an ACK (step S715). If the HARQ for sub-frame n−4 is an ACK from the forward MAC channel, the packet size for sub-frame n−1 is the packet size to be determined latter in step S770 (step S720). Otherwise, if the HARQ for sub-frame n−4 is a NAK, then the sub-packet to be sent at sub-frame n−1 will be the packet sent at sub-frame n−4 (step S725), which means a retransmission is to be performed. After updating TxT2P$_{n-1}$, T2POutFlow$_{i,n-1}$ may be updated accordingly (step S730) as follows:

T2POutflow$_{i,n-1}$=F6(transmitting subpacket size at subframe $n$−1, TxT2P$_{n-1}$), wherein T2POutflow$_{i,n-1}$ denotes the average T2P resource utilized (and subtracted) from the bucket for MAC flow i at sub-frame n−1. After T2POutflow$_{i,n-1}$ is updated, BucketLevelSat$_{i,n}$ and BucketLevel$_{i,n}$ for sub-frame n are subsequently updated (step S740) as follows:

$$BucketLevelSat_{i,n} = f7(T2PInFlow_{i,n-1}, FRAB_{n-1})$$

$$BucketLevel_{i,n} = f8\left(\begin{array}{l}BucketLevel_{i,n-1}, T2PInFlow_{i,n-1}, T2POutFlow_{i,n-1},\\ BucketLevelSat_{1,n}\end{array}\right),$$

wherein BucketLevel$_{i,n}$ represents the bucket level (or accumulated T2P resource) at sub-frame n for MAC flow i, and BucketLevelSat$_{n,s}$, represents the saturation level for BucketLevel$_{i,n}$. Next, PilotStrength$_{n,s}$, QRAB$_n$, FRAB$_n$, and QRABps$_n$ from the forward MAC channel information Pilot-Strength$_{m,s}$, SlotQRAB$_{m,s}$, DRCLock, and SlotFRAB$_{m,s}$ at sub-frame n−1 are updated (step S750), wherein Pilot-Strength$_{n,s}$ represents the filtered pilot strength sampled at the start of sub-frame n for sector s in the active set of the mobile communication device 500, QRAB$_n$ represents the effective QRAB (Quick Reverse Activity Bit) at sub-frame n, FRAB$_n$ represents the effective filtered RAB value at sub-frame n from all sectors in the active set of the mobile communication device 500, QRABps$_n$ indicates the effective Quick RAB value generated at sub-frame n based on PilotStrength$_{n,s}$ of the sectors s in its active set, PilotStrength$_{m,s}$ represents the filtered pilot strength of a sector s in the active set of the mobile communication device 500, DRCLock represents the DRCLock (Data Rate Control Lock) bits, and SlotFRAB$_{m,s}$ represents the filtered value at slot m of the soft RA (Reverse Activity) bit.

With the updated T2POutFlow$_{i,n-1}$, BucketLevelSat$_{i,n}$, BucketLevel$_{i,n}$, PilotStrength$_{n,s}$ and FRAB$_n$, and initialized T2PInFlow$_{i,n-1}$, T2PInFlow$_{i,n}$ may be updated (step S760) as follows:

$$\Delta T2PInFlow_{i,n} = f1\left(\begin{array}{l}PilotStrength_{n,s}, FRAB_n, T2PInFlow_{i,n-1}, BucketLevel_{1,n},\\ BucketLevelSat_{i,n}\end{array}\right)$$

$$T2PInFlow_{i,n} = f2(\Delta T2PInFlow_{i,n}, T2POutFlow_{i,n-1}, T2PInFlow_{i,n-1})$$

Subsequently, the reverse packet (sub-packet) size and transmission mode is determined based on PotentialT2POutflow$_{i,HC}$ and QOutflow$_{i,HC}$ (step S770), wherein PotentialT2POutflow$_{i,HC}$ represents the potential outflow from the bucket for MAC flow i due to a High Capacity mode transmission, and QOutflow$_{i,HC}$ represents the queue outflow (in octets) for MAC flow i with the High Capacity mode transmission. PotentialT2POutflow$_{i,HC}$ and QOutflow$_{i,HC}$ may be obtained as follows:

PotentialT2POutflow$_{i,HC}$=ƒ3(BucketLevel$_{i,n}$, T2PInFlow$_{i,n}$)

QOutflow$_{i,HC}$=ƒ4(Queue size in subframe $n$, PotentialT2POutflow$_{i,HC}$)

Regarding detailed calculation of the reverse packet (sub-packet) size and transmission mode, reference may be made to the 3GPP2 specification of the RevA 1xHRPD system (the 3GPP2 C.S-0024-A v3.0 specification). At last, RRIChannelGain for sub-frame n is calculated (step S780). To be more specific, if the received HARQ is an ACK, the new RRIChannelGain for sub-frame n is calculated as follows:

RRIChannelGainNew$_n$=ƒ9(subpacket 0 at subframe $n$)

Otherwise, if the received HARQ is a NAK, the old RRIChannelGain for sub-frame n is calculated as follows:

RRIChannelGainOld$_n$=ƒ10(subpacket id at subframe $n$)

In addition to the QoS calculation, the mobile communication device 500 also performs symbol processing and modulation of the sub-packets to be transmitted. However, symbol processing and modulation of the sub-packets to be transmitted are beyond the scope of the invention, so detailed description is omitted herein.

While the invention has been described by way of example and in terms of preferred embodiment, it is to be understood that the invention is not limited thereto. Those who are skilled in this technology can still make various alterations and modifications without departing from the scope and spirit of this invention. For example, the mobile communication device 500 and the mobile communication system may be in compliance with 1xCDMA 2000 technology (including RevA 1xHRPD, RevB 1xHRPD, RevC 1xHRPD, and RevD 1xHRPD technologies, or other evolutionary technologies of the 1x CDMA 2000 technology family, or any other wireless communication system), IEEE 802.11a/b/g technology, or LTE technology, etc. The number of interlaces applied in the invention may be any number other than 3. Therefore, the scope of the invention shall be defined and protected by the following claims and their equivalents.

What is claimed is:

1. A mobile communication device for providing Quality of Service (QoS) of packet transmission, wherein the packet transmission is performed by repeating a predetermined number of interlaces by a predetermined cycle, the mobile communication device comprising:
a wireless module transmitting a first sub-packet of a first packet and a first sub-packet of a second packet to a mobile communication network, and receiving a response message corresponding to the first sub-packet of the first packet from the mobile communication network,
wherein the first sub-packet of the first packet is transmitted in a first interlace prior to a second interlace in which the first sub-packet of the second packet is transmitted; and
a controller module calculating a plurality of QoS parameters for a second sub-packet of the second packet in response to the response message, preparing the second sub-packet of the second packet with the QoS parameters, and transmitting the second sub-packet of the second packet in the second interlace to the mobile communication network via the wireless module.

2. The mobile communication device of claim 1, wherein the QoS parameters are calculated according to at least one of the following:
a transmitted Traffic-to-Pilot (T2P) power ratio for a second sub-packet of the first packet;
an average T2P resource utilized for the second sub-packet of the first packet;
an accumulated T2P resource for the second sub-packet of the second packet; and
an average T2P resource for the second sub-packet of the second packet.

3. The mobile communication device of claim 1, wherein the QoS parameters are calculated further according to the first sub-packet of the first packet and the response message.

4. The mobile communication device of claim 1, wherein the QoS parameters comprise information of a packet size and a transmission mode of the second sub-packet of the second packet.

5. The mobile communication device of claim 1, wherein the controller module further performs symbol processing of the second sub-packet of the second packet prior to transmitting the second sub-packet of the second packet in the second interlace to the mobile communication network.

6. The mobile communication device of claim 1, wherein the mobile communication network is a 1x CDMA 2000 system and the QoS of packet transmission is compatible to Reverse Traffic Channel Media Access Control (RTCMAC) Subtype3 Protocol.

7. The mobile communication device of claim 1, wherein the first sub-packet of the first packet and the first sub-packet and second sub-packet of the second packet are transmitted on a forward traffic channel, and the response message is transmitted on a reverse traffic channel.

8. A method for providing QoS of packet transmission in a mobile communication device, wherein the packet transmission is performed by repeating a predetermined number of interlaces by a predetermined cycle, comprising:
transmitting a first sub-packet of a first packet and a first sub-packet of a second packet to a mobile communication network, wherein the first sub-packet of the first packet is transmitted in a first interlace prior to a second interlace in which the first sub-packet of the second packet is transmitted;
receiving a response message corresponding to the first sub-packet of the first packet from the mobile communication network;
calculating a plurality of QoS parameters for a second sub-packet of the second packet in response to the response message;
preparing the second sub-packet of the second packet with the QoS parameters; and
transmitting the second sub-packet of the second packet in the second interlace to the mobile communication network.

9. The method of claim 8, wherein the QoS parameters are calculated according to at least one of the following:
a transmitted Traffic-to-Pilot (T2P) power ratio for a second sub-packet of the first packet;
an average T2P resource utilized for the second sub-packet of the first packet;
an accumulated T2P resource for the second sub-packet of the second packet; and
an average T2P resource for the second sub-packet of the second packet.

10. The method of claim 8, wherein the QoS parameters are calculated further according to the first sub-packet of the first packet and the response message.

11. The method of claim 8, wherein the QoS parameters comprise information of a packet size and a transmission mode of the second sub-packet of the second packet.

12. The method of claim 8, further performing symbol processing of the second sub-packet of the second packet prior to transmitting the second sub-packet of the second packet in the second interlace to the mobile communication network.

13. The method of claim 8, wherein the mobile communication network is a 1x CDMA 2000 system and the QoS of packet transmission is compatible to Reverse Traffic Channel Media Access Control (RTCMAC) Subtype3 Protocol.

14. The method of claim 8, wherein the first sub-packet of the first packet and the first sub-packet and the second sub-packet of the second packet are transmitted on a forward traffic channel and the response message is transmitted on a reverse traffic channel.

15. A mobile communication system for providing Quality of Service (QoS) of packet transmission, wherein the packet transmission is performed by repeating a predetermined number of interlaces by a predetermined cycle, the mobile communication system comprising:
a mobile communication device transmitting a first sub-packet of a first packet and a first sub-packet of a second packet, wherein the first sub-packet of the first packet is transmitted in a first interlace prior to a second interlace in which the first sub-packet of the second packet is transmitted; and
a mobile communication network receiving the first sub-packets of the first packet and the second packet, and transmitting to the mobile communication device a response message corresponding to the first sub-packet of the first packet, wherein the mobile communication device calculates a plurality of QoS parameters for a second sub-packet of the second packet in response to the response message, prepares the second sub-packet of the second packet with the QoS parameters, and transmits the second sub-packet of the second packet in the second interlace to the mobile communication network.

16. The mobile communication system of claim 15, wherein the QoS parameters are calculated according to at least one of the following:
   a transmitted Traffic-to-Pilot (T2P) power ratio for a second sub-packet of the first packet;
   an average T2P resource utilized for the second sub-packet of the first packet;
   an accumulated T2P resource for the second sub-packet of the second packet; and
   an average T2P resource for the second sub-packet of the second packet.

17. The mobile communication system of claim 15, wherein the QoS parameters are calculated further according to the first sub-packet of the first packet and the response message.

18. The mobile communication system of claim 15, wherein the QoS parameters comprise information of a packet size and a transmission mode of the second sub-packet of the second packet.

19. The mobile communication system of claim 15, wherein the mobile communication device further performs symbol processing of the second sub-packet of the second packet prior to transmitting the second sub-packet of the second packet in the second interlace to the mobile communication network.

20. The mobile communication system of claim 15, wherein the first sub-packet of the first packet and the first sub-packet and the second sub-packet of the second packet are transmitted on a forward traffic channel, and the response message is transmitted on a reverse traffic channel, and the QoS of packet transmission is compatible to Reverse Traffic Channel Media Access Control (RTCMAC) Subtype3 Protocol.

* * * * *